Figure 1:
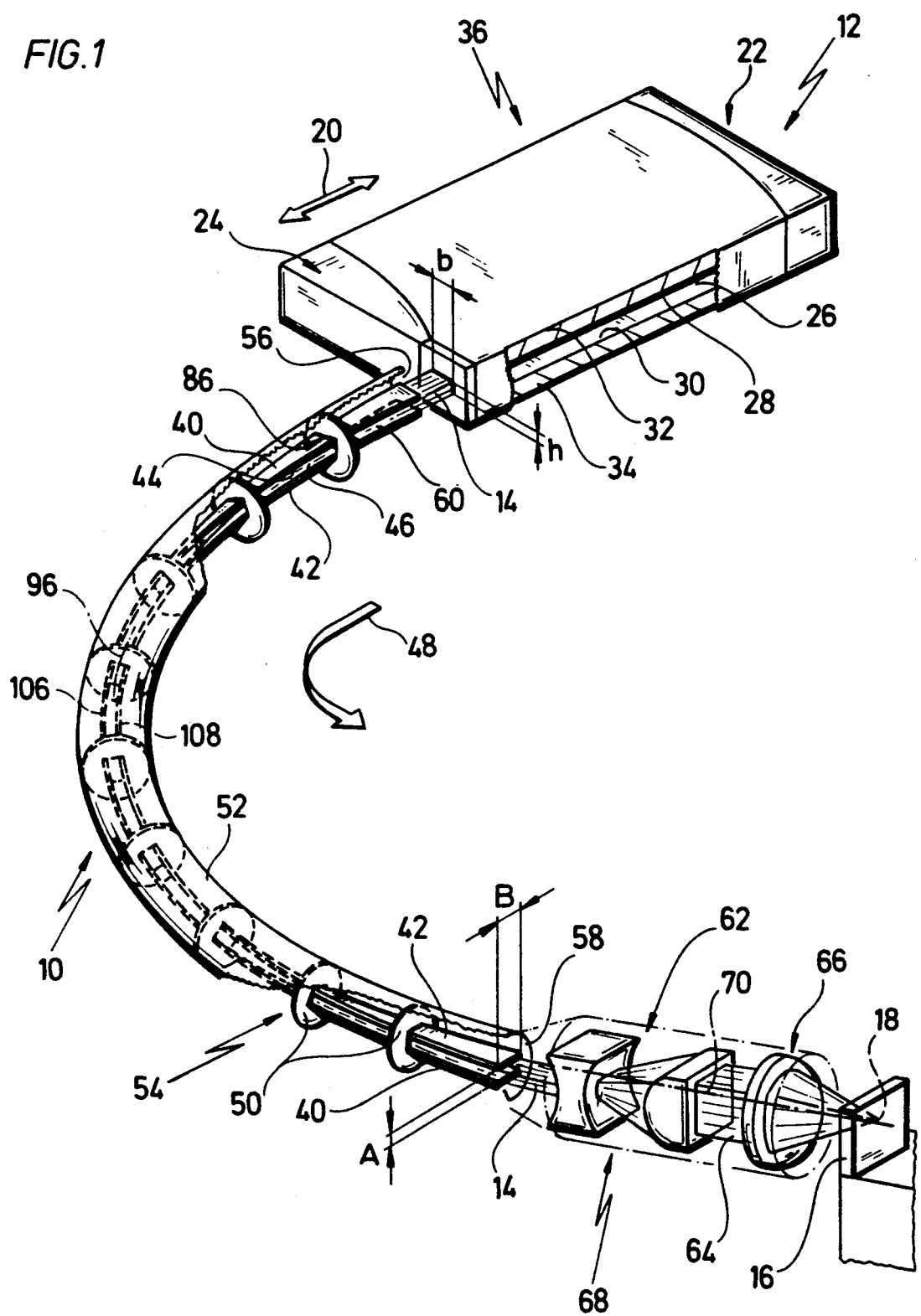

United States Patent
Gehringer et al.

[11] Patent Number: 5,204,931
[45] Date of Patent: Apr. 20, 1993

[54] FLEXIBLE WAVEGUIDE

[75] Inventors: Erwin Gehringer, Boeblingen; Hans Opower, Krailling, both of Fed. Rep. of Germany

[73] Assignee: Deutsche Forschungsanstalt fuer Luft- und Raumfahrt e.V., Bonn, Fed. Rep. of Germany

[21] Appl. No.: 856,246

[22] Filed: Mar. 25, 1992

[30] Foreign Application Priority Data

Mar. 29, 1991 [DE] Fed. Rep. of Germany ....... 4110452
Aug. 3, 1991 [DE] Fed. Rep. of Germany ....... 4125769
Nov. 13, 1991 [DE] Fed. Rep. of Germany ....... 4137256

[51] Int. Cl.$^5$ .............................................. G02B 6/00
[52] U.S. Cl. ..................................... 385/146; 385/147
[58] Field of Search ................ 385/125, 133, 146, 147

[56] References Cited
FOREIGN PATENT DOCUMENTS 59-198404 11/1984 Japan ................................... 385/146
0140202 7/1985 Japan ................................... 385/146

Primary Examiner—John D. Lee
Assistant Examiner—John Ngo
Attorney, Agent, or Firm—Barry R. Lipsitz

[57] ABSTRACT

In order to further develop an optical waveguide comprising first and second optically reflecting wall surfaces extending in a longitudinal direction and having a constant width transversely to the longitudinal direction, both wall surfaces facing one another and extending at a constant spacing from one another and enclosing a space in which radiation is guided by reflection in the longitudinal direction, such that it is flexible and hence permits guidance of the radiation in different directions, it is proposed that a first region of the waveguide be movable in a flexible manner relative to a second region thereof, and that each wall surface be carried for this purpose by a strip which on account of its inherent rigidity is bendable in a non-buckling manner perpendicular to the longitudinal direction and the wall surfaces of the strips be held at a constant spacing from one another by a supporting structure comprising supporting surfaces which are arranged one after the other in the longitudinal direction and against which the strips rest by the application of force for sliding displacement in the longitudinal direction.

75 Claims, 8 Drawing Sheets

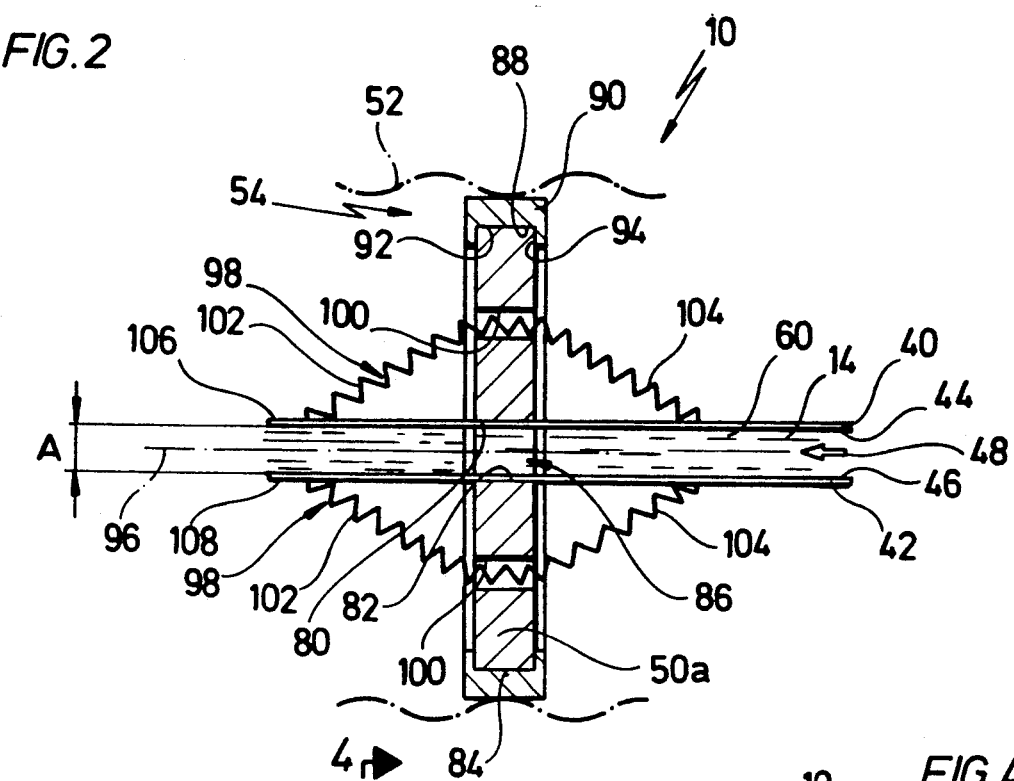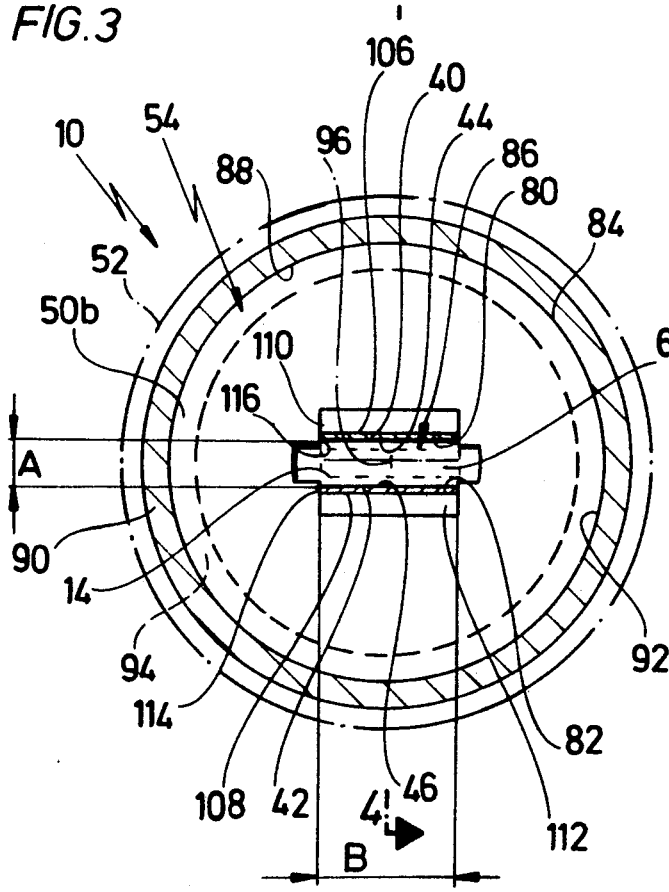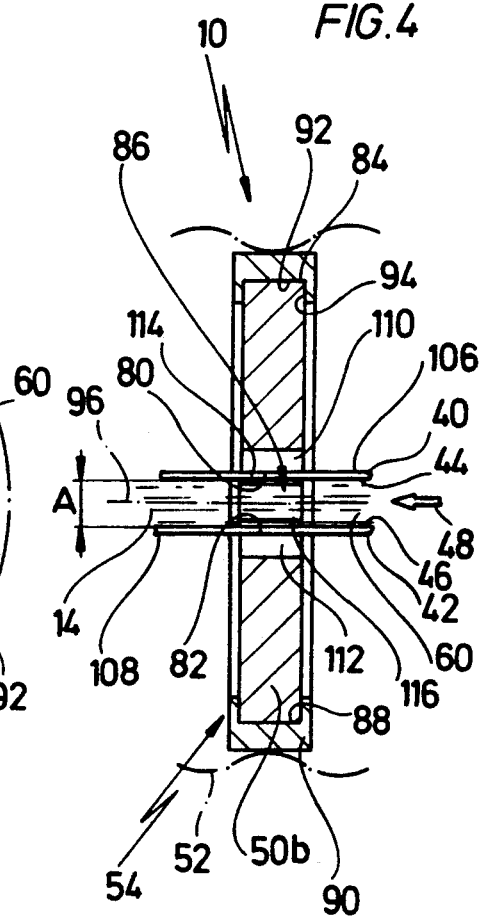

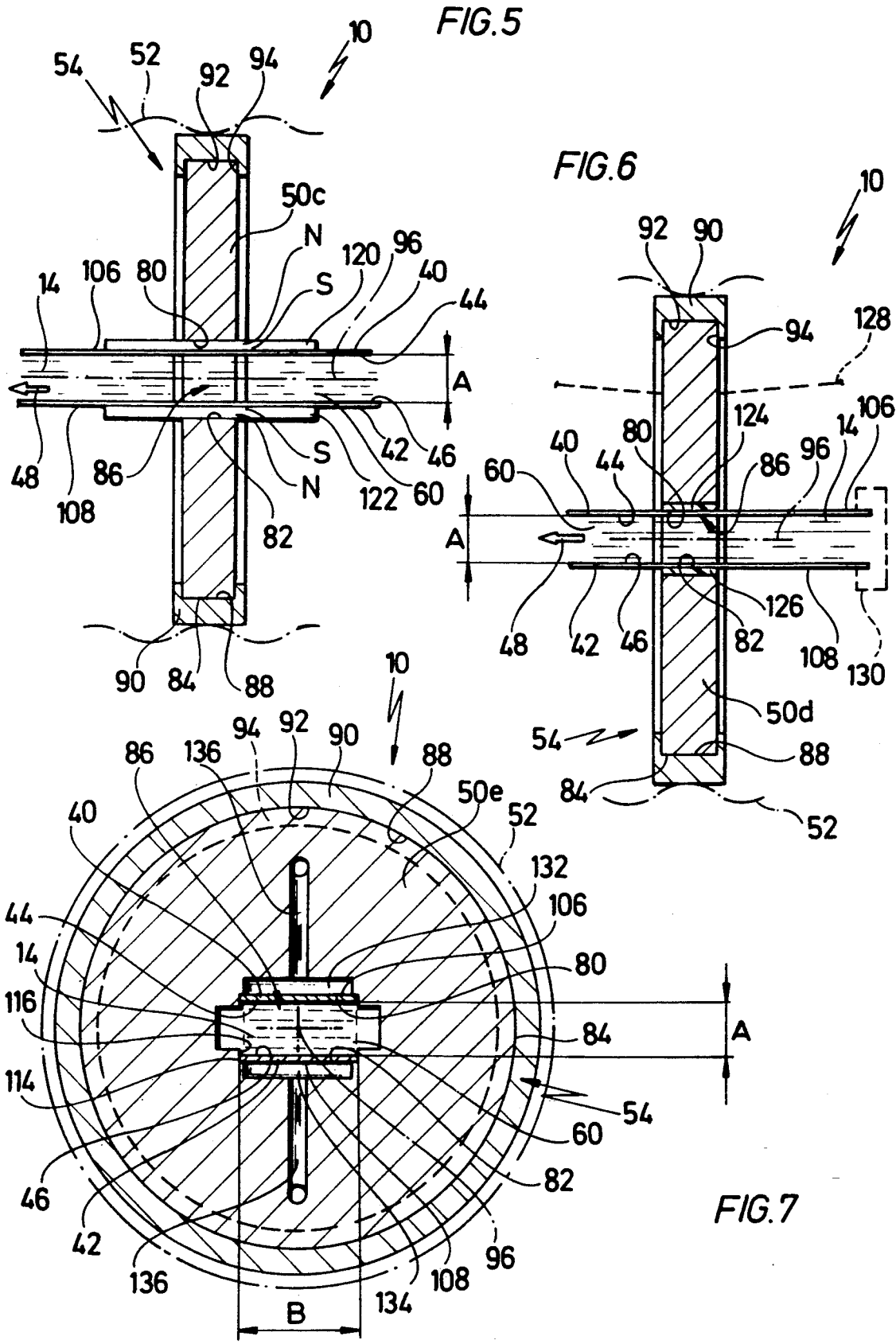

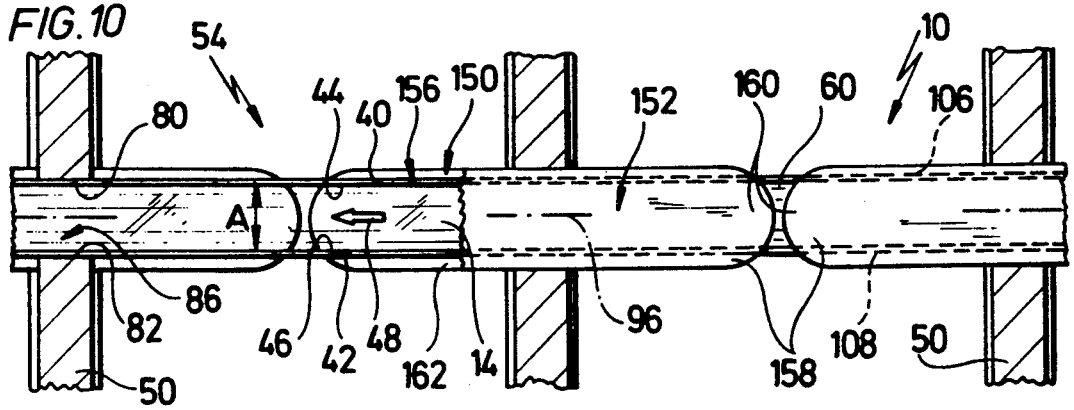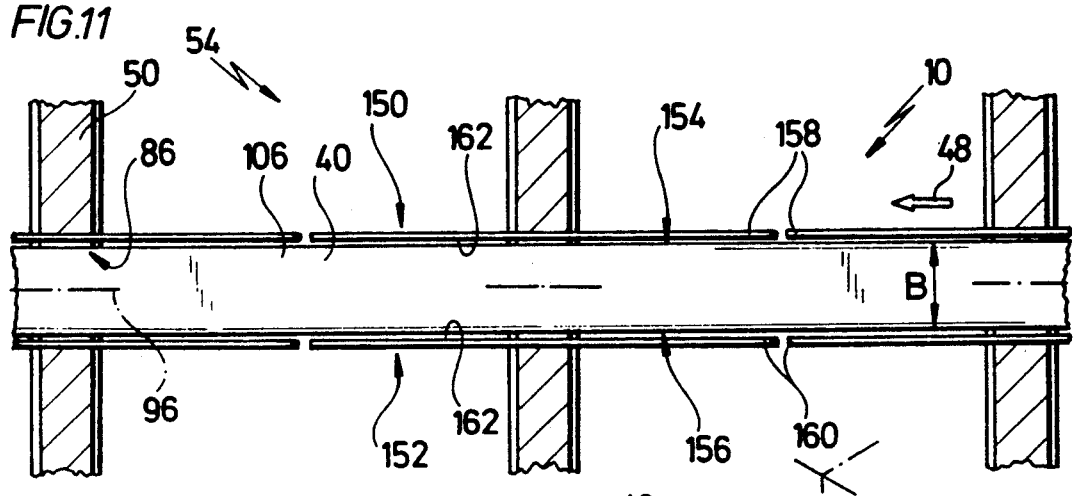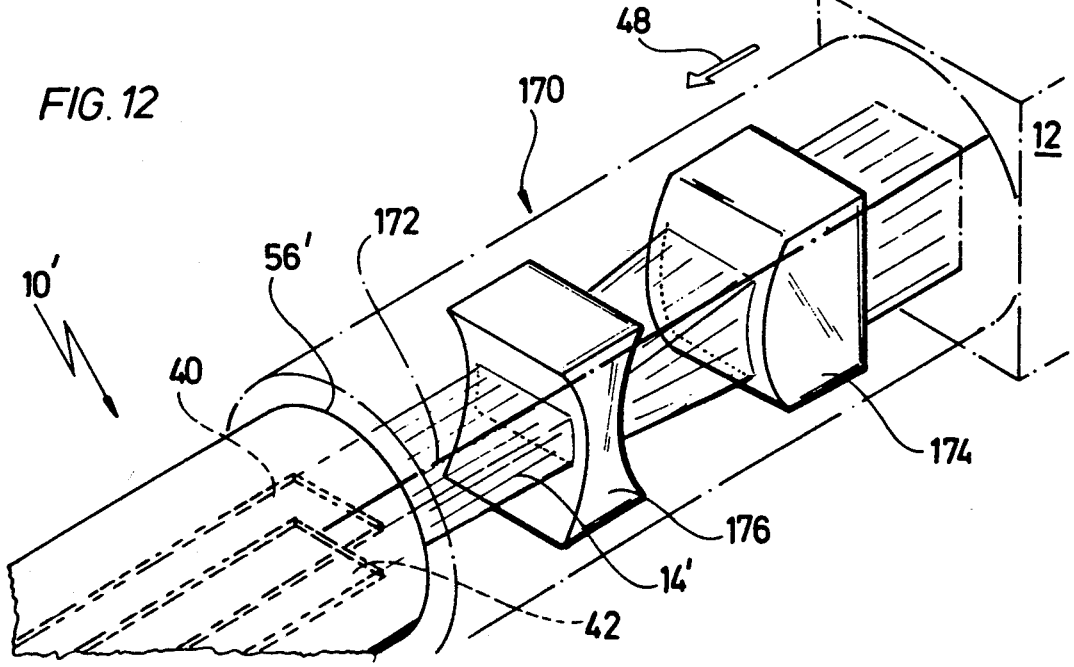

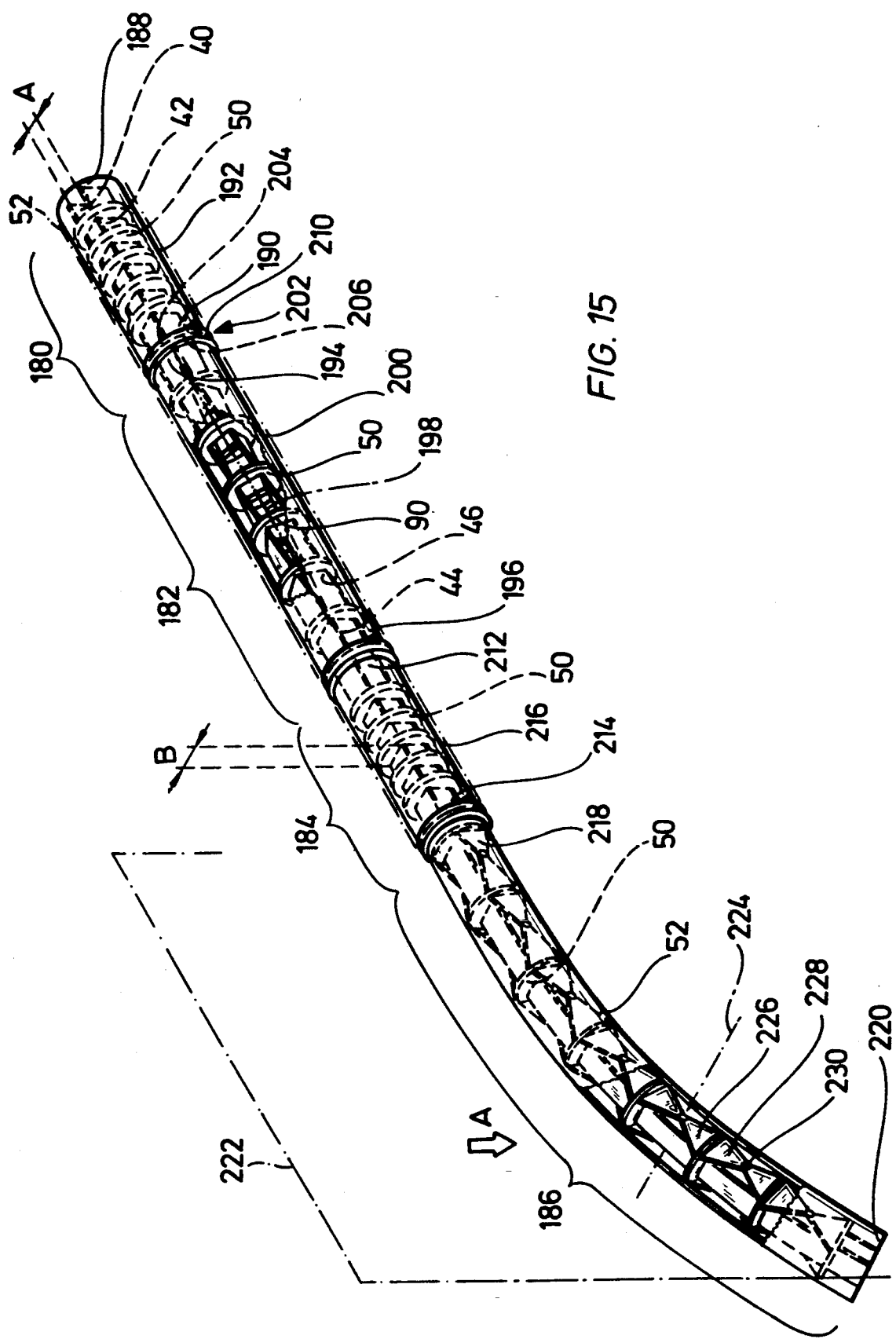

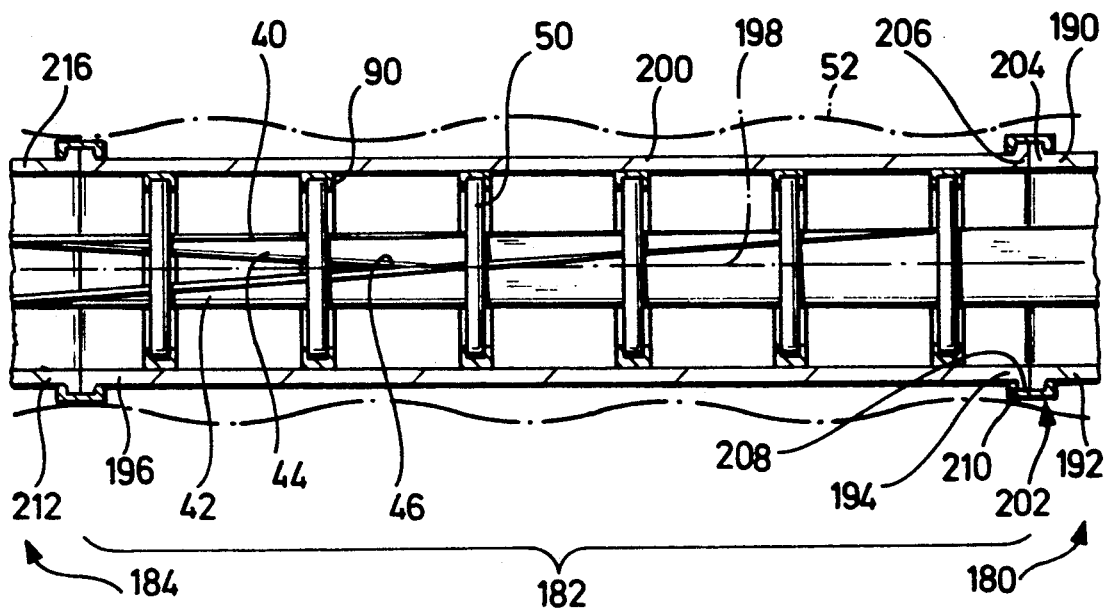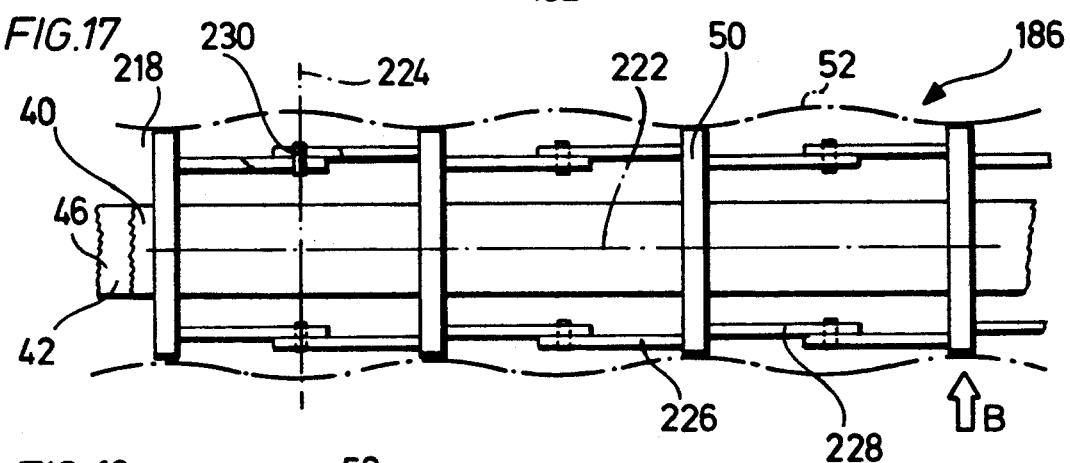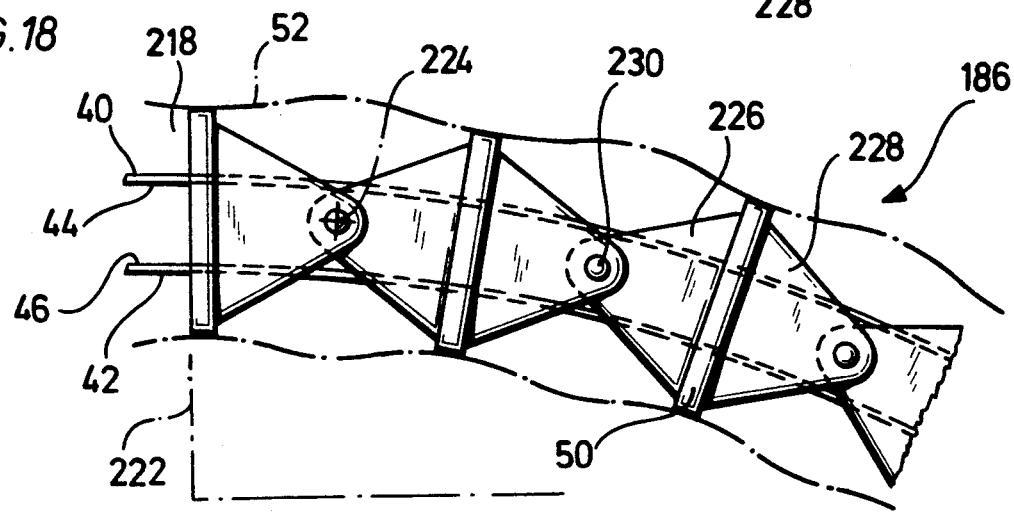

FLEXIBLE WAVEGUIDE

The invention relates to an optical waveguide comprising first and second optically reflecting wall surfaces extending in a longitudinal direction and having a constant width transversely to the longitudinal direction, both wall surfaces facing one another and extending at a constant spacing from one another and enclosing a space in which radiation is guided by reflection in the longitudinal direction.

Such waveguides are known from the prior art; they can be used either independently for conducting optical radiation or together with a resonator for conducting the radiation between two mirrors of this resonator as is known, for example, from EP-A No. 0 305 893.

In laser technology, there is, in general, the problem that flexible guidance of the radiation is not possible when such waveguides are used as these are always of rigid design.

The object underlying the invention is, therefore, to further develop an optical waveguide of the generic kind so that it is flexible and hence permits guidance of the radiation in different directions.

This object is accomplished in accordance with the invention with an optical waveguide of the kind described at the beginning by a first region of the waveguide being movable in a flexible manner relative to a second region thereof and by each wall surface being carried for this purpose by a strip which on account of its inherent rigidity is bendable in a non-buckling manner perpendicular to the longitudinal direction and the wall surfaces of the strips being held at a constant spacing from one another by a supporting structure comprising supporting surfaces which are arranged one after the other in the longitudinal direction and against which the strips rest by the application of force and for sliding displacement in the longitudinal direction.

The advantage of the inventive solution is to be seen in that for the first time a flexible waveguide is made available and owing to its inventive features this waveguide is capable of guiding optical radiation, in particular laser radiation, in a spatially flexible manner.

In particular, this is advantageously achieved, on the one hand, by the inherent rigidity of the strips preventing these from breaking off and, on the other hand, by the supporting surfaces provided by the supporting structure ensuring that the wall surfaces of the strips are at an essentially constant spacing from one another.

Many different possibilities are conceivable for the design of the strips. The strips may be made of plastically bendable material so long as their inherent rigidity permits bending without buckling.

It is, however, particularly advantageous for the strips to be made of elastically movable material and, in particular, for the strips to be made of material designed to spring back elastically into its initial shape. This makes it possible for the optical waveguide to be given a basic shape from which it is movable in a flexible manner in different directions, and the optical waveguide is then always inclined to return to its basic shape.

The initial shape of the strips can, in principle, be of straight orientation, i.e., in this case, the waveguide returns to its straight oriented shape when there is no longer any force acting on it and hence on the strips. However, it is particularly advantageous for the strips to be of bent configuration in their initial shape. When the strips are acted upon by a force to move them, they can thus follow the effect of this force easier as they are already pre-bent in one direction.

The strips of the optical waveguide can, in principle, be bendable in many different directions. However, it is particularly advantageous for the strips to be bendable perpendicular to the wall surfaces as these can then be provided in a simple way with sufficient inherent rigidity to prevent buckling thereof.

Furthermore, it is also advantageous for the strips to be twistable about the longitudinal direction. In this case, too, the degree of inherent rigidity of the strips can easily be chosen such that no buckling occurs.

In a particularly preferred embodiment, provision is made for the strips to be bendable perpendicular to the wall surfaces and twistable about the longitudinal direction. In this case, the inventive waveguide is movable in at least two spatial directions standing perpendicular on one another and possibly also in a third spatial direction standing perpendicular on the above-mentioned spatial directions so that one end of the inventive waveguide is movable relative to the other end—to a limited extent but nevertheless in a flexible manner in all three spatial directions.

The supporting structure could engage the strips in any chosen way. However, it is particularly advantageous for the supporting structure to extend in the longitudinal direction along the strips.

To achieve exact fixing of the strips, it is, furthermore, advantageous for the supporting structure to engage around the strips at least partially.

The inventive supporting structure could, in principle, be made up of one piece extending in the longitudinal direction. However, it is particularly advantageous for the supporting structure to be comprised of a plurality of supporting elements.

Furthermore, in order to position the supporting elements in a defined manner, provision is made for the supporting elements to be connected to one another and to form a coherent supporting structure.

In a particularly preferred embodiment, provision is made for the supporting elements to form the coherent supporting structure by means of an elastically deformable longitudinal connecting element extending in the longitudinal direction of the waveguide.

The supporting elements could be designed in many different ways. In a structurally simple embodiment, provision is made for each of the supporting elements to comprise a supporting surface for each strip.

From a structural viewpoint, it is particularly expedient for the supporting elements to carry supporting surfaces opposite one another.

To enable movement, in particular, twisting of the strips relative to the longitudinal connecting element, provision is advantageously made for the supporting elements to be mounted for rotation on the longitudinal connecting element.

In a particularly advantageous embodiment of the supporting structure, provision is made for the longitudinal connecting element to enclose the supporting elements so that the supporting elements are held securely by the longitudinal connecting element.

An embodiment is particularly advantageous wherein the supporting elements are rotatable within the longitudinal connecting element and relative to it so that the longitudinal connecting element constitutes at least a partial casing of the supporting elements.

Herein it is particularly advantageous for the longitudinal connecting element to be an elastic encasing tube, in particular a corrugated tube.

Regarding the way in which the strips are held in contact with the individual supporting surfaces by the application of force, the scope of the present invention provides many different possibilities.

In one advantageous embodiment, provision is made for the strips to be positioned against the supporting surfaces by an elastic energy accumulator.

In particular, a high degree of flexibility is achieved with a simple construction by each supporting element being provided with an elastic element which positions the respective strip against the corresponding supporting surface by exerting a force on it.

Each supporting element is preferably provided with a spring which engages the strip and urges it against the supporting surface. The spring may engage either the supporting element itself or possibly also the longitudinal connecting element.

As a supplement or alternative to the above-described way of positioning the strips against the supporting surfaces by the application of force, provision is made in a further embodiment for the strips to be positioned against the supporting surfaces by the action of a magnetostatic force.

A permanent magnet is, for example, provided for generating the magnetostatic force, and the strips are positioned by it against the supporting surfaces.

Structurally, this can be implemented by, for example, the strips comprising ferromagnetic material and each supporting element being provided with a permanent magnet.

As an alternative to this, it is, however, also conceivable for the strips to be provided with a permanent magnet and for each supporting element to comprise ferromagnetic material.

It is also conceivable for permanent magnets to be arranged on the supporting structure, for example, between the supporting elements and for these to act on the strips made of ferromagnetic material.

In a further alternative or supplementary possibility for placing the strips on the supporting surfaces by the application of force, provision is made for the strips to be placed against the supporting surfaces by the action of electrostatic force.

Here, too, very different possibilities are conceivable for generating this electrostatic force.

In a structurally preferred possibility, provision is made for the supporting elements to be connected to a different electric potential in relation to the strips.

It is, however, also conceivable for the longitudinal connecting element to be connected to a different electrostatic potential in relation to the strips.

In the first possibility in which the supporting elements are connected to a different electric potential in relation to the strips, this can be implemented structurally in a particularly simple way by an insulating layer resting on the supporting surfaces. Either the insulating layer is freely movable and held on neither the supporting elements nor the strips or, alternatively, it can be fixed on either the supporting elements or the strips.

In a further alternative or supplementary possibility for placing the strips against the supporting elements by the application of force, provision is made for the strips to be positioned against the supporting surfaces by the action of the force of a pressure difference acting on the strips.

The pressure difference can be generated in many different ways. For example, it is conceivable for the space in which the radiation is guided by reflection to be placed under a higher pressure than the environment so that the strips are thereby pushed apart and placed against the supporting surfaces.

As an alternative to this, it is, however, also conceivable for pressure pockets to be provided beside the supporting surfaces, with the pressure pockets preferably lying in the supporting elements.

A negative pressure in relation to the environment is expediently provided in the pressure pockets.

Structurally, the negative pressure can be generated in a particularly simple way by the pressure pockets of all of the supporting elements being connected to one another by a negative pressure line.

The fact that pressure pockets are already used can be further exploited to cool the supporting structure and/or the strips. For example, it is conceivable for coolant to flow through the pressure pockets, in which case this coolant lies at a lower pressure level than the environment.

Quite generally, within the scope of the present invention, it is advantageous for the strips to be cooled by a flow of coolant.

As an alternative or supplement to this, it is, however, also conceivable for the supporting elements to be cooled by a flow of coolant.

In the description of the inventive waveguide, it was not indicated whether the space in which the radiation is conducted is only closed towards two sides, i.e., by the two wall surfaces and is not delimited by a wall at the side of the wall surfaces.

According to the principle of the present invention, delimitation of the space by the two wall surfaces facing one another is fully adequate as these two wall surfaces make the main contribution towards conducting the radiation.

However, in order to avoid further dispersion losses, above all, on account of beam divergences, particularly with long optical waveguides according to the invention, provision is advantageously made for the space for conducting the radiation to be closed at the sides between the strips by reflecting side wall sections.

These reflecting side wall sections are primarily not responsible for the conduction of the optical radiation but are only to reflect back rays exiting on account of excessive beam divergences and thereby reduce the losses.

Within the scope of the invention, it is, however, also advantageous for these reflecting side wall sections to be at least partly designed so as to also have waveguide characteristics.

To provide the optical waveguide according to the invention with sufficient movability and flexibility, provision is advantageously made for the side wall sections to be movable in a direction perpendicular to the wall surfaces of the strips so that movement of the strips relative to the side wall sections occurs during movement of the optical waveguide as a whole.

Furthermore, it is advantageous for the side wall sections to be twistable about the longitudinal direction so they can follow the twisting of twistable strips.

Structurally, the side wall sections according to the invention can be implemented in a simple way by these comprising a plurality of wall section elements.

The wall section elements are preferably arranged one after the other.

In a particularly preferred embodiment, provision is made for the wall section elements to be arranged at a constant spacing from one another.

In the explanation given hereinabove, it was not indicated how the side wall sections are to be held. In principle, it is possible for the side wall sections to be held on the strips. It is, however, particularly advantageous for the side wall sections and, in particular the wall section elements, to be held on the supporting structure.

Such a solution can be implemented in a mechanically simple way by the wall section elements being held by the supporting elements.

Advantageous movability of the side wall sections is also achievable by the wall section elements of a side wall section being movable relative to one another.

In particular, in such a case provision is made for individual wall section elements to be respectively held on the supporting elements and only to be held in alignment relative to one another via the longitudinal connecting element of the supporting elements.

To prevent the wall section elements from knocking together during bending of the optical waveguide according to the invention, provision is preferably made for the wall elements to be rounded off at their ends facing one another.

Furthermore, provision is preferably made for the rounded-off ends of the wall section elements to be spaced at a slight distance from one another, i.e., for the wall section elements to not touch in the initial shape of the waveguide so that the optical waveguide according to the invention can be bent without the wall section elements knocking together with their ends and thereby impeding the bending.

It also makes a positive contribution towards the flexibility of the inventive waveguide for the side wall sections to be arranged at a slight spacing from a side edge of the strips, in particular, during the twisting of the strips about the longitudinal direction.

In the description of the embodiments hereinabove, no details were given about the shape of the wall surfaces. In the simplest case, it is possible for the wall surfaces to extend in straight orientation transversely to the longitudinal direction and to thus be flat in an elongated state of the strips. In another advantageous embodiment, provision is made for a wall surface to have a concave curvature transversely to the longitudinal direction. Better guidance of the laser beam between the two wall surfaces can thereby be achieved and, in particular in the cases where the waveguide is curved, the radiation loss can be kept lower.

The curvature of the wall surface is preferably designed to extend symmetrically in relation to the longitudinal direction.

In principle, the curvature can be of optional design. However, it is particularly advantageous for a change in spacing caused by the curvature of the wall surface between the wall surfaces transversely to the longitudinal direction to be small in relation to the average spacing between the wall surfaces. On the one hand, the advantageous improved beam guidance is thereby achieved and, on the other hand, the characteristics of the waveguide formed by the two strips are not seriously altered.

The curvature can, in principle, be of optional shape. The wall surface provided with the concave curvature is preferably designed as strip of either an elliptical cylinder or circular cylinder.

Particularly advantageous dimensions make provision for a curvature radius to be larger than the average spacing between the wall surfaces by several powers of ten. The curvature radius is preferably larger than the average spacing by a factor of 100 and expediently larger than the average spacing between the wall surfaces by a factor of 1000 at the most.

The variant of the inventive solution described hereinabove can be designed particularly advantageously by both wall surfaces having a concave curvature.

In the explanations of the embodiments hereinabove it was assumed that twisting and/or bending of the strips over the entire length of the optical waveguide is possible with these embodiments.

However, provision is made in a particularly preferred embodiment for the strips to be twistable in a twist segment about a twist axis parallel to the longitudinal direction, i.e., in this case the twist segment represents only part of the entire optical waveguide and the twisting can be localized to this twist segment.

Herein it is particularly expedient for the twist axis to be a straight line, i.e., for no bending of the strips but purely a twisting thereof to take place in the twist segment.

Furthermore, in an advantageous embodiment provision is made for the strips to be longitudinally bendable in a bend segment, i.e., in this case, too, the bending of the strips is localized to the bend segment which represents merely part of the entire optical waveguide.

Herein it is particularly expedient for the wall surfaces to stand during the longitudinal bending essentially perpendicular to a plane of movement in which the strips move during the longitudinal bending. As a result of this feature, there is no twisting of the strips in addition to the bending in the bend segment.

In particular, it is advantageous for the twist segment and the bend segment to be arranged without overlapping one another so that there is complete separation of the twisting and bending of the strips.

In order to prevent between a twist segment and a bend segment propagation of the twisting of the strips from the twist segment into the bend segment and vice-versa, it is particularly advantageous for a segment which is non-twisting and non-bending in the longitudinal direction to be arranged between the twist segment and the bend segment.

There are many different possibilities for the type of design of the twist segment. For example, it is possible for the strips themselves to be designed such that they permit only twisting.

However, it is particularly advantageous for the supporting structure in the twist segment to be designed so as to permit twisting of the strips preferably essentially uniformly so that, on the one hand, the strips are supported via the supporting structure in such a way that their wall surfaces have a constant spacing and, on the other hand, the twisting of the strips is permitted via the supporting structure.

Furthermore, in order to delimit the twisting, it is advantageous for the supporting structure in the twist segment to be designed so as to delimit the twisting of the strips. This makes it possible for excessive twisting of the strips to be prevented at the same time via the supporting structure.

Furthermore, in a preferred embodiment provision is made for the supporting elements in the twist segment to be rotatable relative to one another about the straightline oriented twist axis so that owing to the rotatability of the supporting elements relative to one another it is possible to permit twisting of the strips but to prevent longitudinal bending thereof.

In an advantageous embodiment which is particularly simple from a structural viewpoint provision is made for the supporting structure to have a straight-line oriented reinforcement element for rotatably receiving the supporting elements.

Furthermore, in one embodiment it is advantageous for the supporting structure in the bend segment to be designed so as to permit the longitudinal bending of the strips preferably essentially uniformly so that the longitudinal bendability of the strips is predetermined via the supporting structure and, in addition, there is the possibility of preventing the occurrence of excessive local longitudinal bending.

In a further advantageous embodiment, the supporting structure in the bend segment is designed so as to delimit the longitudinal bending of the strips so that at the same time delimitation of excessive bending and hence prevention of damage to the strips is possible via the supporting structure.

Structurally, this can be implemented in a particularly advantageous way by the supporting elements in the bend segment being movable relative to one another transversely to the longitudinal direction in a plane perpendicular to the wall surfaces.

The simplest way for this movability to be implemented is for the supporting elements in the bend segment to be tiltable about axes of tilt extending parallel to one another and oriented transversely to the longitudinal direction and parallel to the wall surfaces.

In particular in all embodiments in which the twist segment and the bend segment are separate from one another, there is considerably less loss in the guidance of the radiation by the strips than when twist segment and bend segment overlap one another or are coincident. In particular, a significant divergence between the longitudinal direction of the strips and the propagation of the beam can thereby be prevented so that upon separation of twist segment and bend segment, the beam extends essentially always in the longitudinal direction of the strips.

The optical waveguide according to the invention could, in principle, also be used in a laser and hence serve to conduct the radiation between the two mirrors, in which case the laser would then be flexible as a whole.

However, in a particularly advantageous possibility for use the waveguide is designed as flexible laser beam conducting system.

In particular in such a case, provision is made for the waveguide to be provided at its end with an optical means for focusing the beam.

This optical means for focusing the beam is preferably designed such that the waveguide comprises a cylindrical optical means which expands the beam from a, for example, essentially rectangular cross-section to a, in this example, essentially square cross-section having the same expanse in as many directions as possible and hence as high a degree of symmetry as possible and subsequently an optical focusing means for focusing the beam which has been expanded to a square cross-section. In this way, a beam with a rectangular cross-section, in particular with a rectangular waveguide, can be focused uniformly.

It is particularly advantageous for the waveguide to be connected to an outlet opening of a laser, in particular a laser comprising a waveguide, and to serve the purpose of flexibly conducting the laser beam emerging from the laser.

In a particularly preferred embodiment of the optical waveguide according to the invention, provision is made for the width of the two wall surfaces transversely to the longitudinal direction to be a multiple of their spacing, in particular, to be greater than twice the spacing or, even better, than three or four times this spacing.

The object underlying the invention is also accomplished by a laser system which comprises a stationary laser head and is characterized in that a waveguide according to the invention with one or several of the abovedescribed features is connected to the stationary laser head.

Herein it is particularly advantageous for the laser head to be a waveguide laser.

The special advantage of the optical waveguide according to the invention as flexible laser beam conducting system can be exploited when the waveguide is connected to the laser head without an optical means for shaping the beam being connected between these.

In particular in such a case, provision is made in a particularly preferred embodiment of the inventive laser system for the wall surfaces of the strips of the waveguide to have a width transversely to the longitudinal direction which at least corresponds to the width of the laser beam emerging from the laser head or exceeds it.

Furthermore, it is advantageous for the wall surfaces of the strips of the waveguide to have a spacing which corresponds to the spacing of the waveguide surfaces of the laser head.

In particular in the last two cases mentioned hereinabove, it is ensured that the waveguide will take over the laser beam with exactly the same waveguide characteristics as those of the laser head designed as waveguide laser.

Particularly simple transition of the laser beam from the laser head to the optical waveguide according to the invention is achieved by the wall surfaces of the strips being in direct alignment with the waveguide surfaces of the laser head.

Further features and advantages of the present invention are the subject matter of the following description and the appended drawings of several embodiments.

Figure 8:
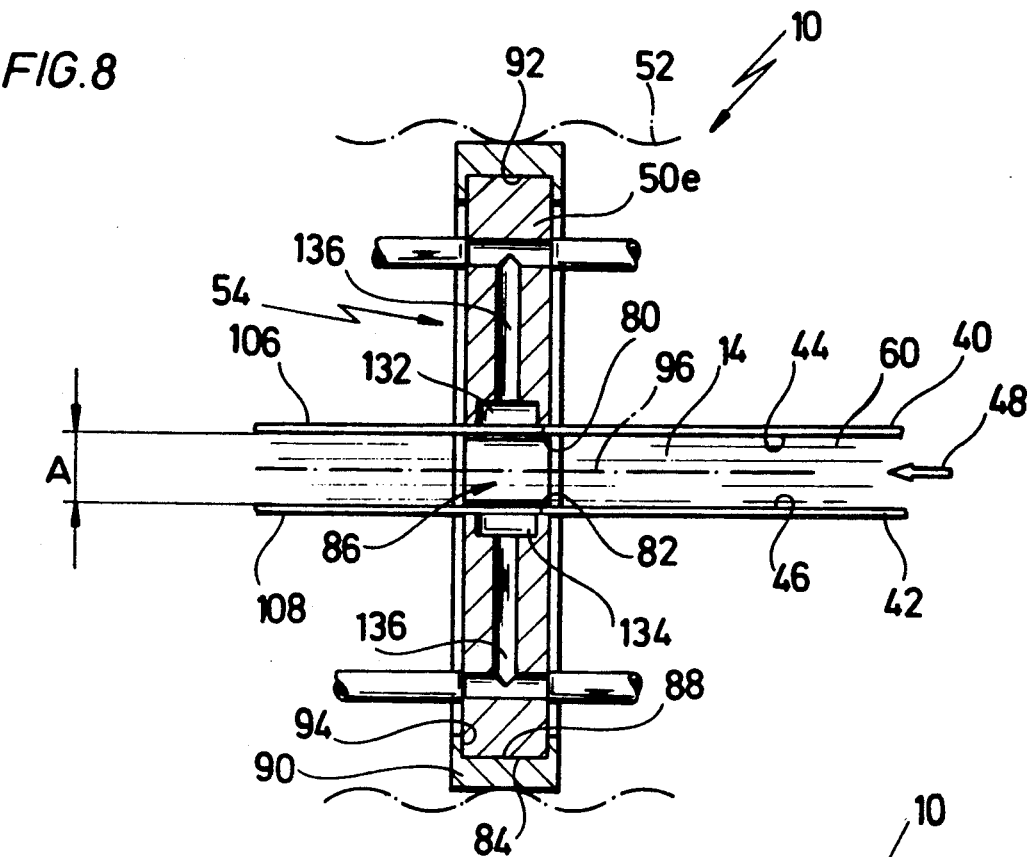
Figure 9:
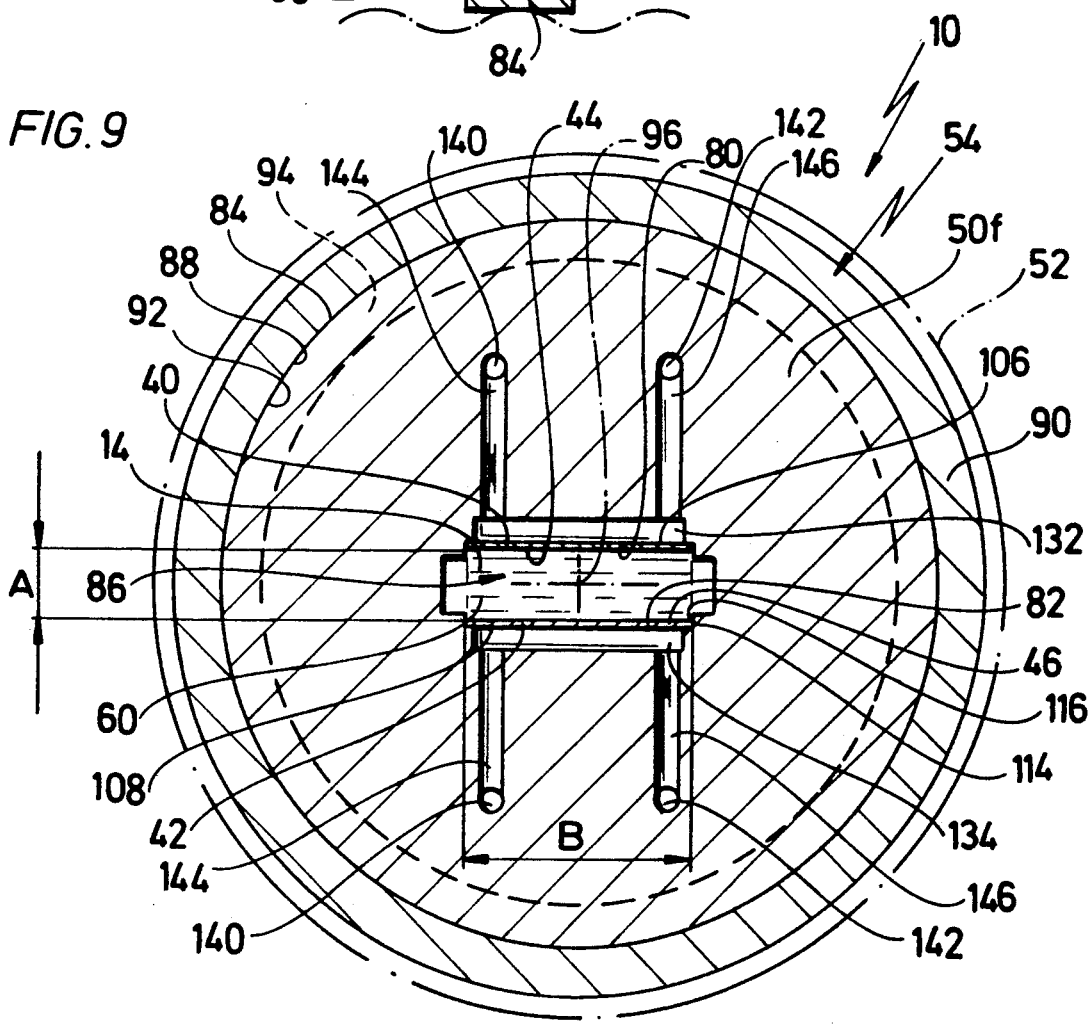
Figure 13:
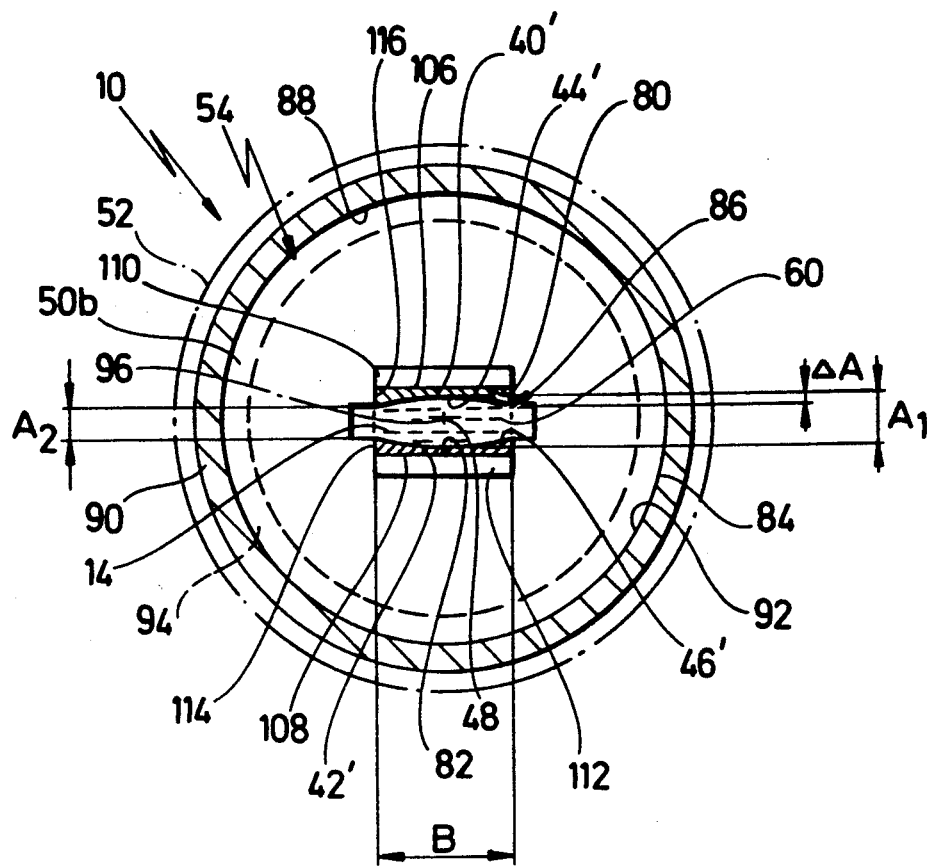
Figure 14:
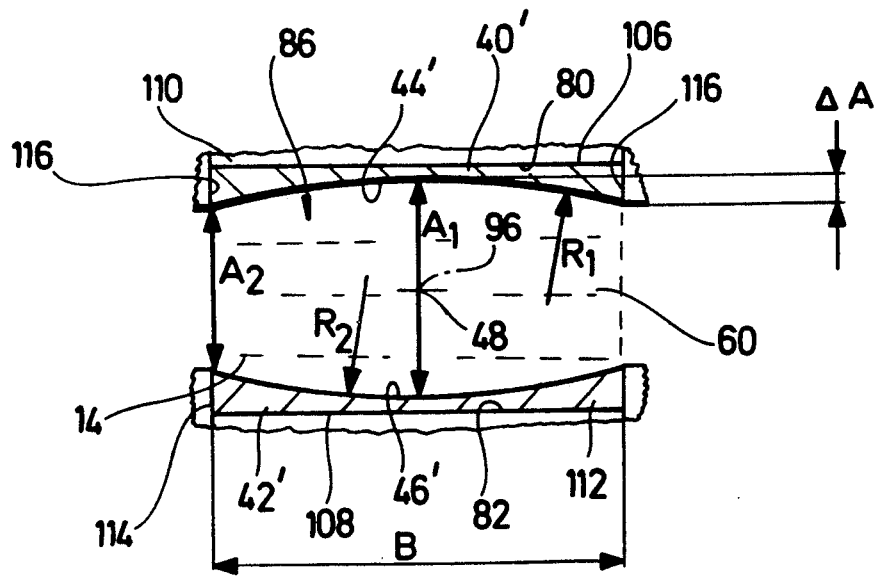

The drawings show:

FIG. 1 a schematic perspective illustration of an inventive laser system with a laser head and a first embodiment of the inventive waveguide;

FIG. 2 a partial longitudinal section through a first variant of the waveguide according to FIG. 1 in the region of a supporting element;

FIG. 3 a cross-section through a second variant of an inventive waveguide with a plan view of one of its supporting elements in the longitudinal direction;

FIG. 4 a section along line 4—4 through the supporting element of the second variant of the waveguide;

FIG. 5 a section similar to FIG. 4 through a supporting element of a third variant of an inventive waveguide;

FIG. 6 a section similar to FIG. 4 through a supporting element of a fourth variant of an inventive waveguide;

FIG. 7 a cross-section through a fifth variant of an inventive waveguide extending through the supporting element thereof;

FIG. 8 a section similar to FIG. 4 through the supporting element of the fifth variant;

FIG. 9 a section similar to FIG. 7 through a supporting element of a sixth variant of the inventive waveguide;

FIG. 10 a longitudinal section through a second embodiment of an inventive waveguide including the strips and wall section elements shown in partly broken-open representation;

FIG. 11 a longitudinal section through the second embodiment with a cutting plane perpendicular to that of the longitudinal section in FIG. 10;

FIG. 12 a perspective partial illustration of a third embodiment of an inventive waveguide in an end region facing a laser head;

FIG. 13 an illustration similar to FIG. 3 of a fourth embodiment;

FIG. 14 an enlarged partial illustration of the two strips with their respective wall surfaces;

FIG. 15 a schematic perspective illustration similar to FIG. 1 of a fifth embodiment;

FIG. 16 an enlarged partial and sectional illustration of a second segment in FIG. 15;

FIG. 17 an enlarged partial plan view in the direction of arrow A of a fourth segment in FIG. 15; and FIG. 18 a plan view in the direction of arrow B in FIG. 17.

An inventive laser system, illustrated in its entirety in FIG. 1, comprises an inventive waveguide 10 which extends from a laser head 12 and serves to transmit a laser beam 14 to an object 16 to be irradiated.

For this purpose, the waveguide 10 is of flexible design so that, for example, the focusing point 18 lying on the object 16 is movable over the object 16 by moving the waveguide 10 while the laser head 12 remains stationary.

The laser head 12 is preferably a waveguide laser as disclosed, for example, in EP-A No. 0 305 893, to which reference is made in full in this connection.

This waveguide laser comprises two mirrors 22 and 24 of an optically unstable resonator which are arranged in spaced relation to one another in a longitudinal direction 20. The resonator extends with a beam path running in the longitudinal direction 20 and transversely to the longitudinal direction 20 through a volume region 26 of a high-frequency-excited laser gas.

This volume region 26 is delimited on two sides facing one another by a top wall surface 28 and a bottom wall surface 30. These are both designed as optical waveguide surfaces and are carried by a wall 32 and 34, respectively, of a laser waveguide 36 extending in the longitudinal direction 20 between the mirrors 22 and 24.

This laser waveguide 36 guides the radiation propagating in the resonator in the longitudinal direction 20 by reflection at the top wall surfaces 28 and the bottom wall surfaces 30 which are of optically reflecting design, and the mirrors 22 and 24 additionally ensure propagation of the beam path perpendicular to the longitudinal direction 20.

The laser beam 14 emerging from such a laser head 12 has an essentially rectangular geometry. Perpendicular to the wall surfaces 28 and 30, the laser beam 14 has a height h which corresponds approximately to the spacing of the wall surfaces 28 and 30 and in a cross-sectional direction parallel to the wall surfaces 28 and 30 a width b which corresponds approximately to the difference in the extent of the mirrors 22 and 24 perpendicular to the longitudinal direction 20 and parallel to the wall surfaces 28 and 30.

This laser beam 14 with a rectangular cross-section is advantageously conducted by the inventive waveguide 10 to the object 16.

The inventive waveguide 10 comprises two strips 40 and 42 which have wall surfaces 44 and 46 facing one another. The wall surfaces 44 and 46 are arranged at a constant spacing A from one another which preferably corresponds to the height h of the laser beam 14.

The two strips 40 and 42 extend jointly in a longitudinal direction 48 of the waveguide 10, and the longitudinal direction 48 can also be a bent line. The longitudinal direction 48 is defined by a line extending midway between the wall surfaces 44 and 46.

Furthermore, the wall surfaces 46 extend transversely to the longitudinal direction 48, i.e., from one side edge of the strips 40 and 42 to the other over a width B which is preferably at least equal to the width b of the laser beam. The longitudinal direction 48 thus extends mid-way between the two side edges of the strips 40 and 42, respectively.

In order to guide the strips 40 and 42 with their wall surfaces 44 and 46 at a constant spacing from one another, there is provided in the waveguide 10 a plurality of supporting elements 50 which are arranged at certain spacings from one another in the longitudinal direction 48. The supporting elements 50 are preferably arranged at constant spacings from one another and hold the strips 40 and 42 in a way which will be described in detail hereinbelow. The supporting elements 50 are themselves held in a casing 52 which together with the supporting elements forms a supporting structure 54. The casing 52 surrounds both the supporting elements 50 and the two strips 40 and 42 and preferably extends from an entrance end region 56 of the waveguide 10 to an exit end region 58 thereof.

Furthermore, in the system illustrated in FIG. 1, the strips 40 and 42 are attached to the laser waveguide 36 such that their wall surfaces 44 and 46 are in alignment with the wall surfaces 28 and 30, respectively, i.e., these lie in one plane. Hence the laser beam 14 enters a space 60 which is defined by the two wall surfaces 44 and 46 and in which the laser beam 14 is guided in the longitudinal direction 48 as far as the end region 58.

The laser beam 14 then emerges from this space 60 again at the end region 58 in substantially unchanged form and with an intensity corresponding to the intensity of the laser beam 14 entering the waveguide 10, reduced by the losses in the waveguide 10.

After leaving the space 60, this laser beam 14 emerging at the end region 58 enters a cylindrical optical means 62 by means of which the laser beam 14 with rectangular cross-section is expanded into a laser beam 64 with essentially square cross-section which, in turn, is then focused by an optical focusing means 66 into the focusing point 18 lying, for example, on the surface of the object 16.

The cylindrical optical means 62 and the optical focusing means 66 together form an optical imaging means 68 associated with the end region 58 of the inventive waveguide 10. The optical imaging means 68 is preferably held at the end region 58 of the waveguide 10 and is thus fixedly arranged in the end region 58 relative to the strips 40 and 42 such that its optical axis 70 represents the continuation of the longitudinal direction 48 in the end region 58 so that the focusing point 18 likewise lies on the optical axis 70.

The laser beam 14 is conducted in the inventive waveguide from the end region 56 to the end region 58 in the space 60 by reflection thereof at the wall surfaces 44 and 46 which, for this purpose, are of optically reflecting design.

In the case of a $CO_2$ laser as laser head 12, the wall surfaces 44 and 46 are, for example, provided with an infrared reflecting coating, preferably a copper coating.

Furthermore, the strips 40 and 42 are made of a material which owing to its inherent stiffness is bendable in a non-buckling manner perpendicular to the longitudinal direction 48 and perpendicular to the wall surfaces 44, 46, the degree of inherent stiffness being such that bending of the inventive waveguide results in as large a curvature as possible extending over the entire length of the waveguide between the end region 56 and the end region 58 thereof.

The strips 40 and 42 are also twistable about the longitudinal axis 48.

To this end, the strips 40, 42 are preferably made of a metal band, preferably a steel band, in particular a spring-steel band.

An embodiment of the strips 40 and 42 is particularly preferred wherein these are designed so as to spring back elastically into their original shape, the strips 40 and 42 having in their original shape a curvature between the end region 56 and the end region 58 so that the longitudinal direction 48 in the end region 56 does not coincide with the longitudinal direction 48 in the end region 58. The strips 40 and 42 are preferably curved in partially circular or S-shaped configuration.

Several embodiments are conceivable for the supporting of the strips 40 and 42 by the supporting elements 50.

All embodiments have in common, as illustrated in FIG. 2, that each of the supporting elements, in FIG. 2 supporting element 50a, has a supporting surface 80 and a supporting surface 82 for the strip 40 and 42, respectively.

The supporting surfaces 80 and 82 are preferably arranged facing one another.

In the simplest case, illustrated in FIG. 2, the supporting element 50a is a ring with a circular-cylindrical outer surface 84 and a central recess 86, and these form the two supporting surfaces 80 and 82.

Furthermore, the supporting element 50a is mounted in a groove 88 of a holding ring 90 which, for its part, is fixedly connected to the casing 52. The groove 88 extends circumferentially in ring-shaped configuration and is open in the inward direction.

The supporting element 50a is supported with its circular cylindrical outer surface 84 in a groove bottom 92 of the groove 88 while the two side walls 94 of the groove 88 guide the supporting element 50a at the end faces thereof.

The supporting element 50a is thus arranged for rotation with respect to the holding ring 90 and hence also the casing 52.

The recess 86 preferably lies such that the two supporting surfaces 80 and 82 lie symmetrically in relation to an axis of rotation 96 about which the supporting element 50a is rotatable in the holding ring 90.

The casing 52 fixedly connected to the holding ring 90 is, for its part, formed either by an elastic hose-like element or, for example, by a corrugated tube made of metal which is likewise elastically bendable.

The guidance of the strips 40 and 42 in the supporting structure 54 in such a way that their wall surfaces 44 and 46 always have a constant spacing A from one another is implemented by the strips 40 and 42 always resting against the supporting surfaces 80 and 82 and thereby being able to displaceably slide in the longitudinal direction 48 on the supporting surfaces 80 and 82.

The force required to position the strips 40 and 42 on the supporting surfaces 80 and 82 is applied by an elastic energy accumulator 98 in the form of a spring which penetrates the supporting element 50a at a spacing from the supporting surface 80 and 82, respectively, through a bore 100 and extends from this bore with two legs 102 and 104 in trapezoidal configuration to the strip 40 and 42, respectively, and is attached to the latter in the longitudinal direction 48 at a spacing from the supporting surface.

As the strips 40 and 42 are not compressible in the longitudinal direction 48 and, therefore, move relative to one another upon movement of the inventive waveguide 10, movement relative to the supporting elements 50a also has to be made possible, in particular when these are fixedly connected to the casing 52 in the longitudinal direction 48. This movability of the strips 40 and 42 relative to one another and relative to the supporting element 50a is made possible by the strips 40 and 42 being supported on the supporting surface 80 and 82 for sliding movement in the longitudinal direction 48, this relative movement of each of the strips 40 and 42 relative to the supporting element 50a being fixed by the spacing of the points of application of the legs 102 and 104 on the respective strip 40 and 42. The point of application is, therefore, always to be selected such that adequate movement of the strip in the longitudinal direction 48 relative to the supporting surface 80 is ensured.

To this end, each of the strips 40 and 42 is preferably provided on its side opposite the wall surfaces 44 and 46, respectively, with a sliding surface 106 and 108, respectively, which slides on the supporting surface 80 and 82, respectively, in the longitudinal direction 48.

In a second variant of an inventive waveguide 10, the supporting element 50b is held in the same way as the supporting element 50a in the casing 52 by the holding ring 90 and so reference is to be had in full in this connection to the statements on the first variant illustrated in FIG. 2.

The recess 86 is likewise arranged symmetrically in relation to the axis of rotation 96 so that the supporting surfaces 80 and 82 also lie symmetrically in relation to the axis of rotation 96.

In contrast with the first variant, however, in the second variant the positioning of the strips 40 and 42 on the supporting surfaces 80 and 82 is carried out by magnetostatic forces.

To this end, two permanent magnets 110 and 112 adjoin the supporting surfaces 80 and 82 in the supporting element 50b and position the strips 40 and 42 against the supporting surfaces 80 and 82 owing to the force of magnetic attraction they exert on the strips 40 and 42. For this purpose, the strips 40 and 42 are preferably made of ferromagnetic material to enable as great a force of attraction as possible.

The strips 40 and 42 are likewise provided with sliding surfaces 106 and 108 which can slide in the longitudinal direction 48 over the supporting surfaces 80 and 82.

Furthermore, side guiding surfaces 116 are provided for guiding the strips in the recess 86 transversely to the longitudinal direction 48. These side guiding surfaces 116 rest against opposite side rims 114 of the strips 40 and 42 and guide the strips 40 and 42, respectively, transversely to the longitudinal direction 48 and hence allow movability of the strips 40 and 42 only in the longitudinal direction 48 parallel to the axis of rotation 96.

In a third variant of the inventive waveguide, illustrated in FIG. 5, magnetostatic forces are used to position the strips 40 and 42 against the supporting surfaces 80 and 82 by the application of force, exactly as in the second embodiment, illustrated in FIGS. 3 and 4.

In contrast with the second variant of the inventive waveguide, illustrated in FIGS. 3 and 4, permanent magnets 110 and 112 are not provided in the supporting element 50c of this embodiment but instead each of the strips 40 and 42 carries on its side opposite the optically reflecting wall surface 44 and 46, respectively, a strip 120 and 122, respectively, of permanent magnetized material, for example, a strip of plastic material comprising permanent magnets aligned parallel to one another.

These strips 120 and 122 of permanent-magnetized material simultaneously form on their surfaces facing away from the strips 40 and 42 the sliding surfaces 106 and 108 which, for their part, slide on the supporting surfaces 80 and 82, respectively, in the longitudinal direction 48.

To achieve an adequate effect of attraction between the magnetized strips 120 and 122, the supporting element 50a is made of magnetizable, preferably ferromagnetic material, so that magnetostatic forces of attraction are active between this and the strips 120 and 122 and, consequently, owing to the strips 120 and 122, respectively, fixed on the strips 40 and 42, the strips 40 and 42, for their part, are guided in indirect contact on the supporting surfaces 80 and 82 and hence displaceability of the strips 40 and 42, respectively, relative to the supporting element 50c is possible in the same way as described in conjunction with the first two variants.

In a fourth variant of the inventive waveguide 10, illustrated in FIG. 6, in contrast with the second and third variants, it is not magnetostatic but electrostatic forces that are active.

For the rest, the supporting element 50d is mounted in the same way as in the first variant for rotation in the casing 52 and so reference is to be had in this connection to the statements on the first variant.

The recess 86 is also arranged in the same way as in the first variant symmetrically in relation to the axis of rotation 96.

To achieve electrostatic interaction between the strips 40 and 42 and the supporting surfaces 80 and 82, respectively, there is arranged between the supporting surfaces 80 and 82 and the sliding surfaces 106 and 108, respectively, of the strips 40 and 42, respectively, an insulating layer 124 and 126, respectively, so that it is possible to connect the strips 40 and 42 to a different electric potential with respect to the supporting element 50d and, consequently, an electrostatic attraction can be generated between the strips 40 and 42 and the supporting surfaces 80 and 82, respectively, of the supporting element 50d to position the strips 40 and 42 indirectly on the supporting surfaces 80 and 82 by interposition of the insulating layer 124 and 126, respectively.

The insulating layer 124 and 126, respectively, can be fixed on the supporting surfaces 80 and 82, respectively. It is, however, also possible for the insulating layer 124 and 126, respectively, to be fixedly arranged on the sliding surfaces 106 and 108, respectively, or for it to be allowed to slide freely with respect to both the supporting surfaces 80 and 82, respectively, and the sliding surfaces 106 and 108, respectively.

In order to connect all of the supporting elements 50d to a common electric potential, these are preferably connected by electric lines 128, while the two strips 40 and 42 are likewise connected by a flexible electric line 130 and, furthermore, the strips 40 and 42 as well as the supporting elements 50d are connected, for example, in one of the end regions 56 or 58 to the potential source required for generating the electrostatic forces of attraction.

In a fifth embodiment of an inventive waveguide, illustrated in FIGS. 7 and 8, the supporting element 50e is mounted in the same way as in the first variant by means of the holding ring 90 for rotation in the casing 52.

In like manner, the supporting surfaces 80 and 82 also lie symmetrically in relation to the axis of rotation 96.

In contrast with the embodiments described hereinabove, the strips 40 and 42 are acted upon by a force acting in the direction of the supporting surfaces 80 and 82, respectively, by a pressure difference between a pressure pocket 132 and 134, respectively, in the supporting surfaces 80 and 82, respectively. Herein a negative pressure line 136 which connects all of the pressure pockets 132 and 134 in all of the supporting elements 50e with one another opens into each of the pressure pockets 132 and 134, respectively. When a negative pressure in relation to the pressure prevailing inside the casing 50e and outside the pressure pockets 132 and 134 is generated via the pressure line 136 in the pressure pockets 132 and 134, the strips 40 and 42 are held against the supporting surfaces 80 and 82 by the application of a force but they can slide with their sliding surfaces 106 and 108, respectively, over the supporting surfaces 80 and 82, respectively, in the longitudinal direction 48.

A sixth variant of an inventive waveguide, illustrated in FIG. 9, is based on the same principle as the variant illustrated in FIGS. 7 and 8, but with the difference that the pressure pockets 132 and 134 remain at negative pressure in relation to the rest of the interior of the casing 52 but, in addition, a coolant flows through them.

In this embodiment, there leads to each supporting element 50f a feed line 140 for the coolant and a drain line 142 for the coolant which are respectively connected via stub lines 144 and 146, respectively, to the pressure pockets 132 and 134, respectively, both the feed line 140 and drain line 142 lying at a pressure level which lies below the ambient pressure in the casing 52 so that the strips 40 and 42, respectively, are still held in contact with the supporting surfaces 80 and 82, respectively, by the application of a force owing to the negative pressure in the pressure pockets 132 and 134, respectively, and slide with their sliding surfaces 106 and 108, respectively, over the supporting surfaces 80 and 82, respectively.

In each of the variants described hereinabove, the space 60 in which the laser beam 14 is guided in the inventive waveguide 10 is not closed off in the region of its open sides which are not delimited by the wall surfaces 44 and 46. In a second embodiment of the inventive waveguide, the space 60 is delimited in the region of these sides by side wall sections 150 and 152, respectively, which extend along side rims 154 and 156, respectively, of the strips 40 and 42, respectively, as illustrated in FIGS. 10 and 11.

Each of the side wall sections 150 and 152 is preferably of such flexible design that it can follow the movements of the two strips 40 and 42, respectively.

To this end, the side wall sections 150 and 152, respectively, are comprised of single wall section elements 158 which are each held with a central region on one of the supporting elements 50 and extend on either side of the respective supporting element along the side rims 154 and 156, respectively, of the strips 40 and 42, respectively, preferably at a slight distance from the side rims 154 and 156, respectively.

Each of the wall section elements 158 is rounded off at its end 160 so that successive wall section elements 158 point towards one another with their rounded-off ends, but are preferably arranged with their rounded-off ends at a slight spacing from one another and in succession in the longitudinal direction 48.

Hence the wall section elements 158 are preferably designed such that they extend from the supporting element on which they are held as far as almost half of the spacing from the following supporting element.

In order to reflect all of the beam components of the laser beam 14 emerging at the sides from the space 60 back into the space 60, all of the wall section elements 158 are provided on their inner sides 162 facing the strips 40 and 42 with an optically reflecting coating, in particular an infrared reflecting coating which may be identical to the coating of the strips 40 and 42 forming the wall surfaces 44 and 46.

Owing to the fact that all of the supporting elements 50 are mounted for rotation in the casing 52, it is also possible to twist the strips 40 and 42 about the longitudinal direction when wall section elements 158 are provided as each wall section element 158 may be offset at an angle of rotation in relation to the following wall section element.

In order to ensure as good closure of the space 60 as possible in spite of this twisting, the wall section elements 158 are of such dimensions in their extent in the direction of the spacing A, i.e., perpendicular to the wall surfaces 44 and 46, that this extent is greater than the spacing A and that the wall section elements 158 are arranged symmetrically in relation to the space 60 and extend beyond this when the strips 40 and 42 are standing in their initial position. In this case, twisting of the strips 40 and 42 causes a slight dislocation of successive wall section elements 158 about a slight angle of rotation, but the covering at the sides of the space 60 is still maintained in the region of the wall section elements 158.

Aside from that, the second embodiment is identical to the first embodiment and so the same parts bear the same reference numerals and reference is to be had for details of their design to the statements on the first embodiment.

With respect to the design of the strips 40 and 42 and the casing, a third embodiment 10' of an inventive waveguide is identical to the first embodiment of the inventive waveguide 10 with all its variants and so reference is to be had in this connection to the statements on the first embodiment.

In contrast with the first embodiment, however, the end region 56' is not directly connected to a laser head 12 which itself is designed as a waveguide laser, but instead a laser beam 14' is coupled in by means of an optical coupling-in means 170 which, for example, in the case of the laser beam 14' symmetrical in relation to an axis 172, consists of a cylindrical optical means with a convex lens 174 followed by a concave lens 176. The laser beam 14' first impinges upon the convex cylindrical lens 174, is focused by it and then impinges upon the cylindrical dispersing lens which generates a laser beam 14' with a rectangular cross-section which corresponds to the width B and the spacing A of the wall surfaces 44 and 46 of the strips 40 and 42.

In the simplest case, namely when the laser beam 14' already has in the direction of the width B an extent which corresponds approximately to it or is smaller than it, it is adequate for the cylindrical lenses 174 and 176 to have cylinder axes which extend parallel to one another and parallel to the planes extending from the wall surfaces 44 and 46 in the end region 56'.

If the laser beam 14' has a different extent in the planes of the wall surfaces 44 and 46 in the end region 56', then the cylindrical lenses 174 and 176 have to be designed cylindrically about a further axis, namely about an axis standing perpendicular on the wall surfaces 44 and 46, to thereby also enable adaptation of the extent of the laser beam 14' in the direction of the width B.

Aside from that, the waveguide 10' is identical to the waveguide 10 and so for a description of the remaining features, reference is to be had to the statements on the first waveguide 10.

A fourth embodiment of an inventive waveguide, illustrated in FIGS. 13 and 14, is in principle of the same design as the second variant of the first embodiment, illustrated in FIG. 3. For this reason, the same reference numerals are used. For a description of the individual parts bearing these reference numerals, reference is likewise to be had in full to the statements on the first embodiment and its second variant.

In contrast with the first embodiment, the strips 40' and 42' are provided with concavely curved wall surfaces 44' and 46', respectively, which are curved transversely to the longitudinal direction 48 in the direction of the width B of the wall surfaces 44' and 46' symmetrically in relation to the longitudinal direction 48 so that a spacing A1 between the waveguide surfaces 44' and 46' at the center thereof is the maximum spacing and a spacing A2 at the side rim of the wall surfaces 44 and 46 is the minimum spacing.

The curvature of the two wall surfaces 44' and 46' is preferably so slight that the difference between A1 and A2 is substantially smaller than the average spacing A which, for example, can be determined as average value from A1 and A2.

The wall surface 44' preferably represents a strip of a cylindrical surface with the radius R1 and the wall surface 46' a strip of a cylindrical surface with the radius R2. The radii R1 and R2 are preferably identical. The dimensions of the radii R1 and R2 are preferably such that they are substantially smaller than the spacing A, in particular the average spacing A, of the two wall surfaces 44' and 46'. For example, with a width of the strips 40' and 42' of 5 to20 mm, the radius R1 and R2, respectively, is of such size that it lies between 100 and 2,000 mm.

As illustrated in FIG. 14, the strips 40' and 42' are preferably of flat design on their side opposite the wall surfaces 44' and 46', respectively, transversely to the longitudinal direction 48 so that they can rest against a supporting surface 80 and 82, respectively, of flat design.

It is, however, also possible for the side facing away from the wall surface 44' and 46', respectively, to be of convex design so that it, in turn, rests in a concave supporting surface 80 and 82, respectively, with the curvatures of the surfaces resting against one another preferably being identical.

A fifth embodiment of an inventive waveguide, illustrated in FIG. 15, comprises a first segment 180, a second segment 182, a third segment 184 and a fourth segment 186 which are all joined together one after the other.

In the first segment 180, the strips 40 and 42 are held by the supporting elements 50 such that a first end 188 of the first segment 180 is immovable relative to a second end 190 of the first segment 180. In this case, the supporting elements 50 are preferably arranged in a non-displaceable and non-rotatable manner in a rigid tube 192.

At the end 188, this waveguide is, for example, connected to a laser.

The second segment 182, designed as twist segment, is connected with a first end 194 to the end 190 and has a second end 196 which is twistable about a twist axis 198 relative to the first end, with the twist axis 198 thereby remaining a straight line. As described hereinabove in connection with FIG. 2, the supporting elements 50 are mounted for this purpose in a holding ring 90 for rotation about the twist axis 198, with all of the holding rings 90 being arranged in a rigid tube 200 which ensures that all of the supporting elements 50 are rotatable in the holding rings 90 coaxially with the twist axis 198.

Hence the strips 40 and 42 are twistable as a whole about the twist axis 198 so that the wall surfaces 44 and 46 are turned at the second end 196 relative to the alignment of the wall surfaces 44 and 46 at the first end 194 through an angle of, for example, 90°, as illustrated in FIGS. 15 and 16. To limit the twisting, the rotatability of the supporting elements 50 relative to one another is preferably delimited by stop elements.

The connection between the first segment and the second segment is implemented, for example, by a rotary connection 202 between the tubes 192 and 200 which is preferably likewise movable to a limited extent. The rotary connection 202 is, for example, designed such that both the tube 192 and the tube 200 comprise a flange 204 and 206, respectively, which rotatably engage a groove 208 of a connecting ring 210.

The third segment 184 is designed in the same way as the first segment 180, i.e., the two ends 212 and 214 of the third segment are neither movable nor rotatable relative to one another so that all of the supporting elements 50 are likewise held in a non-rotatable and non-displaceable manner in a rigid tube 216 which, in turn, is connected to the tube 200 by a rotary connection which is preferably of exactly the same design as the rotary connection between the first segment and the second segment 182.

Adjoining this third segment is the fourth segment 186 which is designed as bend segment and has a first end 218 and a second end 220. The second end 220 is moveable relative to the first end 218 in a plane of movement 222 which stands perpendicular on the wall surfaces 44 and 46 of the strips 40 and 42 in the fourth segment 186. Hence in the fourth segment the strips 40 and 42 are bendable in the plane of movement 222 without twisting.

To achieve this, the supporting elements 50 are tiltable one with another about an axis of tilt 224 which lies, for example, mid-way between two successive supporting elements 50 and is aligned parallel to the wall surfaces 44 and 46, i.e., perpendicular to the plane of movement 222.

Each of the supporting elements 50 is provided with two arms 226 extending in the direction of the previous supporting element on either side of the strips 40 and 42 and with two arms 228 extending in the direction of the following supporting element, the arms 228 of the previous supporting element 50 being articulated on the arms 226 of the following supporting element 50 by means of pins 230 which are aligned coaxially with the respective axis of tilt 224.

Owing to the arms 226 and 228 being fixedly connected to the respective supporting element 50, all of the supporting elements 50 are only tiltable relative to one another about the axis of tilt 224 but not rotatable about the longitudinal direction and so twisting of the strips 40 and 42 about the longitudinal direction is eliminated. The tiltability is preferably also delimited by stop elements.

Furthermore, as illustrated in FIGS. 17 and 18, the supporting elements 50, for their part, are arranged in the casing 52 of the entire waveguide and enclosed by it, the casing 52 extending either only in the fourth segment 186 or also over the tubes 216, 200 and 192. Only in the region of the fourth segment 186 is it necessary for the casing 52 to be of flexible design, i.e., for example, in the form of a corrugated tube or corrugated hose.

Furthermore, in the fourth segment the supporting element 50 is connected at the end 218 in a non-rotatable and non-displaceable manner either with the tube 216 or with the supporting element 40 at the end 214 of the third segment.

In all, an inventive waveguide according to the fifth embodiment has with respect to the movability of the end 220 of the fourth segment 186 relative to the end 188 of the first segment 180 two regions responsible for different movements, i.e., the fourth segment which permits movability in the plane of movement 222, and the second segment 182 which permits rotation about the twist axis 198 so that the end 220 of the fourth segment is flexibly movable in space relative to the end 188 of the first segment, the movability being comprised of rotation about the twist axis 198 and bending in the plane of movement 22. With an even higher degree of flexibility of an inventive waveguide, further segments allowing twisting or bending in a plane of movement can be inserted.

In principle, the first segment 180 and the third segment 184 are not absolutely necessary. However, they improve the transition of the strips 40 and 42 passing through all of the segments 180, 182, 184 and 186 from the segment 182 to the segment 186 and between the second segment 182 and the connection to a laser.

What is claimed is:

1. Optical slab- or strip-shaped waveguide comprising first and second optically reflecting wall surfaces extending in a longitudinal direction and having a constant width transversely to said longitudinal direction, both wall surfaces facing one another and extending at a constant spacing from one another and enclosing a space in which radiation is guided by reflection in said longitudinal direction, said waveguide having a first region movable in a flexible manner relative to a second region thereof, and for this purpose each wall surface being carried by a strip which on account of its inherent rigidity is bendable in a non-buckling manner perpendicular to said longitudinal direction, said wall surfaces of said strips being held by a supporting structure at a substantially constant spacing from one another, said supporting structure comprising supporting surfaces which are arranged one after the other in said longitudinal direction and against which said strips rest by the application of force and for sliding displacement in said longitudinal direction.

2. Optical waveguide as defined in claim 1, characterized in that said strips are designed to spring back elastically into their initial shape.

3. Optical waveguide as defined in claim 2, characterized in that said strips are bent in their initial shape.

4. Optical waveguide as defined in claim 1, characterized in that said strips are bendable in a direction perpendicular to said wall surfaces.

5. Optical waveguide as defined in claim 1, characterized in that said strips are twistable about said longitudinal direction.

6. Optical waveguide as defined in claim 1, characterized in that said supporting structure extends in said longitudinal direction along said strips.

7. Optical waveguide as defined in claim 1, characterized in that said supporting structure engages around said strips at least partially.

8. Optical waveguide as defined in claim 1, characterized in that said supporting structure has a plurality of supporting elements.

9. Optical waveguide as defined in claim 8, characterized in that said supporting elements are connected to one another and form said coherent supporting structure.

10. Optical waveguide as defined in claim 8, characterized in that said supporting elements form said coherent supporting structure by means of an elastically deformable longitudinal connecting element extending in said longitudinal direction of said waveguide.

11. Optical waveguide as defined in claim 10, characterized in that said supporting elements are mounted for rotation on said longitudinal connecting element.

12. Optical waveguide as defined in claim 10, characterized in that said longitudinal connecting element encloses said supporting elements.

13. Optical waveguide as defined in claim 12, characterized in that said supporting elements are rotatable within said longitudinal connecting element and relative to it.

14. Optical waveguide as defined in claim 10, characterized in that said longitudinal connecting element is an elastic encasing tube.

15. Optical waveguide as defined in claim 14, characterized in that said longitudinal connecting element is a corrugated tube.

16. Optical waveguide as defined in claim 8, characterized in that each of said supporting elements has a supporting surface for each strip.

17. Optical waveguide as defined in claim 16, characterized in that said supporting elements carry supporting surfaces opposite one another.

18. Optical waveguide as defined in claim 8, characterized in that said supporting elements are cooled with a flow of coolant.

19. Optical waveguide as defined in claim 1, characterized in that said strips are positioned against said supporting surfaces by an elastic energy accumulator.

20. Optical waveguide as defined in claim 19, characterized in that each supporting element is provided with an elastic element which exerts a force on the respective strip to position it against the corresponding supporting surface.

21. Optical waveguide as defined in claim 20, characterized in that each supporting element is provided with a spring which engages said strip and urges it against said supporting surface.

22. Optical waveguide as defined in claim 1, characterized in that said strips are positioned against said supporting surfaces by the action of a magnetostatic force.

23. Optical waveguide as defined in claim 21, characterized in that said strips are positioned against said supporting surfaces by a permanent magnet.

24. Optical waveguide as defined in claim 22, characterized in that said strips comprise ferromagnetic material and each supporting element is provided with a permanent magnet.

25. Optical waveguide as defined in claim 22, characterized in that said strips are provided with a permanent magnet and each supporting element comprises ferromagnetic material.

26. Optical waveguide as defined in claim 1, characterized in that said strips are positioned on said supporting surfaces by the action of electrostatic force.

27. Optical waveguide as defined in claim 26, characterized in that said supporting elements are connected to a different electric potential in relation to said strips.

28. Optical waveguide as defined in claim 27, characterized in that an insulating layer rests on said supporting surfaces.

29. Optical waveguide as defined in claim 1, characterized in that said strips are positioned against said supporting surfaces by the action of the force of a pressure difference acting on said strips.

30. Optical waveguide as defined in claim 29, characterized in that pressure pockets are provided beside said supporting surfaces.

31. Optical waveguide as defined in claim 1, characterized in that a negative pressure in relation to the environment prevails in said pressure pockets.

32. Optical waveguide as defined in claim 31, characterized in that said pressure pockets of all supporting elements are connected to one another by a negative pressure line.

33. Optical waveguide as defined in claim 30, characterized in that a coolant flows through said pressure pockets.

34. Optical waveguide as defined in claim 1, characterized in that said strips are cooled by a flow of coolant.

35. Optical waveguide as defined in claim 1, characterized in that said space for guiding said radiation is closed at the sides between the strips by reflecting side wall sections.

36. Optical waveguide as defined in claim 35, characterized in that said side wall sections are movable in a direction perpendicular to said wall surfaces of said strips.

37. Optical waveguide as defined in claim 35, characterized in that said side wall sections are twistable about said longitudinal direction.

38. Optical waveguide as defined in claim 35, characterized in that said side wall sections comprise a plurality of wall section elements.

39. Optical waveguide as defined in claim 38, characterized in that said wall section elements are arranged one after the other.

40. Optical waveguide as defined in claim 38, characterized in that said side wall sections are held on said supporting structure.

41. Optical waveguide as defined in claim 40, characterized in that said wall section elements are held by said supporting elements.

42. Optical waveguide as defined in claim 38, characterized in that said wall section elements are arranged at a constant spacing from one another.

43. Optical waveguide as defined in claim 38, characterized in that said wall section elements of a side wall section are movable relative to one another.

44. Optical waveguide as defined in claim 38, characterized in that said wall section elements are rounded off at their ends facing one another.

45. Optical waveguide as defined in claim 44, characterized in that said rounded-off ends of said wall section elements are spaced at a slight distance from one another.

46. Optical waveguide as defined in claim 35, characterized in that said side wall sections are arranged at a slight spacing from a side edge of said strips.

47. Optical waveguide as defined in claim 1, characterized in that one of said wall surfaces has a concave curvature transversely to said longitudinal direction.

48. Optical waveguide as defined in claim 47, characterized in that said curvature extends symmetrically in relation to said longitudinal direction.

49. Optical waveguide as defined in claim 47, characterized in that a change in spacing caused by said curvature of said wall surfaces between said wall surfaces transversely to said longitudinal direction is small in relation to the average spacing between said wall surfaces.

50. Optical waveguide as defined in claim 47, characterized in that the curvature radius is greater than the average spacing between said wall surfaces by several powers of ten.

51. Optical waveguide as defined in claim 47, characterized in that both wall surfaces have a concave curvature.

52. Optical waveguide as defined in claim 1, characterized in that said strips are twistable in a twist segment about a twist axis parallel to said longitudinal direction.

53. Optical waveguide as defined in claim 52, characterized in that said twist axis is a straight line.

54. Optical waveguide as defined in claim 52, characterized in that said twist segment and said bend segment are arranged so as not to overlap one another.

55. Optical waveguide as defined in claim 54 characterized in that a segment which is non-twisting and non-bending in the longitudinal direction is arranged between said twist segment and said bend segment.

56. Optical waveguide as defined in claim 52, characterized in that the supporting structure in said twist segment is designed so as to permit the twisting of said strips.

57. Optical waveguide as defined in claim 56, characterized in that said supporting structure in said twist segment is designed so as to delimit the twisting of said strips.

58. Optical waveguide as defined in claim 56, characterized in that the supporting element in said twist segment are rotatable relative to one another about said straight-line oriented twist axis.

59. Optical waveguide as defined in claim 58, characterized in that said supporting structure has a straight-line oriented reinforcement element for rotatably receiving said supporting elements.

60. Optical waveguide as defined in claim 1, characterized in that said strips are longitudinally bendable in a bend segment.

61. Optical waveguide as defined in claim 54, characterized in that during the longitudinal bending, said wall surfaces stand essentially perpendicular to a plane of movement in which said strips move during the longitudinal bending.

62. Optical waveguide as defined in claim 60, characterized in that said supporting structure in said bend segment is designed so as to permit the longitudinal bending of said strips.

63. Optical waveguide as defined in claim 62, characterized in that said supporting structure in said bend segment is designed so as to delimit the longitudinal bending of said strips.

64. Optical waveguide as defined in claim 62, characterized in that said supporting elements in said bend segment are movable relative to one another transversely to said longitudinal direction.

65. Optical waveguide as defined in claim 64, characterized in that said supporting elements in said bend segment are tiltable about axes of tilt extending parallel to one another and oriented transversely to said longitudinal direction and parallel to said wall surfaces.

66. Optical waveguide as defined in claim 1, characterized in that said waveguide is designed as a flexible laser beam conducting system.

67. Optical waveguide as defined in claim 1, characterized in that said waveguide is provided at its end with an optical means for focusing the beam.

68. Optical waveguide as defined in claim 67, characterized in that said waveguide comprises a cylindrical optical means which expands said beam to a cross-section having the same expanse in many directions and subsequently an optical focusing means which focuses said beam which has been expanded to a square cross-section.

69. Optical waveguide as defined in claim 68, characterized in that said waveguide is connected to an outlet opening of a laser and serves to flexibly conduct said laser beam emerging from said laser.

70. Laser system comprising a stationary laser head, and a waveguide being connected to said stationary laser head, said waveguide comprising first and second optically reflecting wall surfaces extending in a longitudinal direction and having a constant width transversely to said longitudinal direction, both wall surfaces facing one another and extending at a constant spacing from one another and enclosing a space in which radiation is guided by reflection in said longitudinal direction, a first region of said waveguide being movable in a flexible manner relative to a second region thereof, and each wall surface being carried for this purpose by a strip which on account of its inherent rigidity is bendable in a non-buckling manner perpendicular to said longitudinal direction, said wall surfaces of said strips being held by a supporting structure at a substantially constant spacing from one another, said supporting structure comprising supporting surfaces which are arranged one after the other in said longitudinal direction and against which said strips rest by the application of force and for sliding displacement in said longitudinal direction.

71. Laser system as defined in claim 70, characterized in that said laser head is a waveguide laser.

72. Laser system as defined in claim 70, characterized in that said waveguide is connected to said laser head without an optical means for shaping said beam being connected between these.

73. Laser system as defined in claim 71, characterized in that said wall surfaces of said strips of said waveguide have a width (B) transversely to said longitudinal direction which at least corresponds to said width (b) of said laser beam emerging from said laser head.

74. Laser system as defined in claim 71, characterized in that said wall surfaces of said strips of said waveguide have a spacing (A) which corresponds to the spacing of said waveguide surfaces of said laser head.

75. Laser system as defined in claim 74, characterized in that said wall surfaces of said strips are in direct alignment with said waveguide surfaces of said laser head.

* * * * *